A. H. GIBSON.
CONTROLLER FOR ELECTRICALLY DRIVEN PULSATORS.
APPLICATION FILED JAN. 4, 1909.
915,951.
Patented Mar. 23, 1909.
2 SHEETS—SHEET 1.
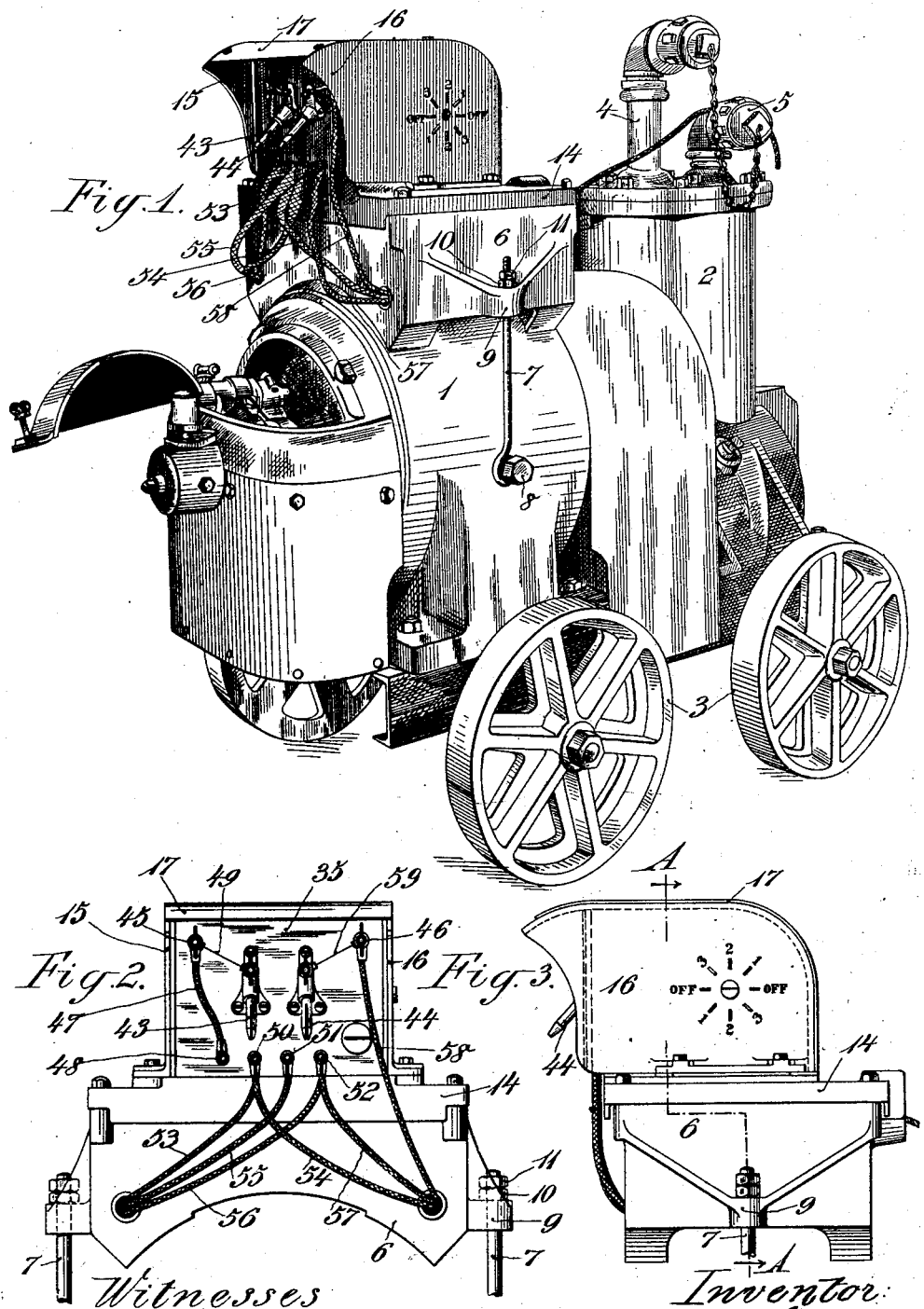

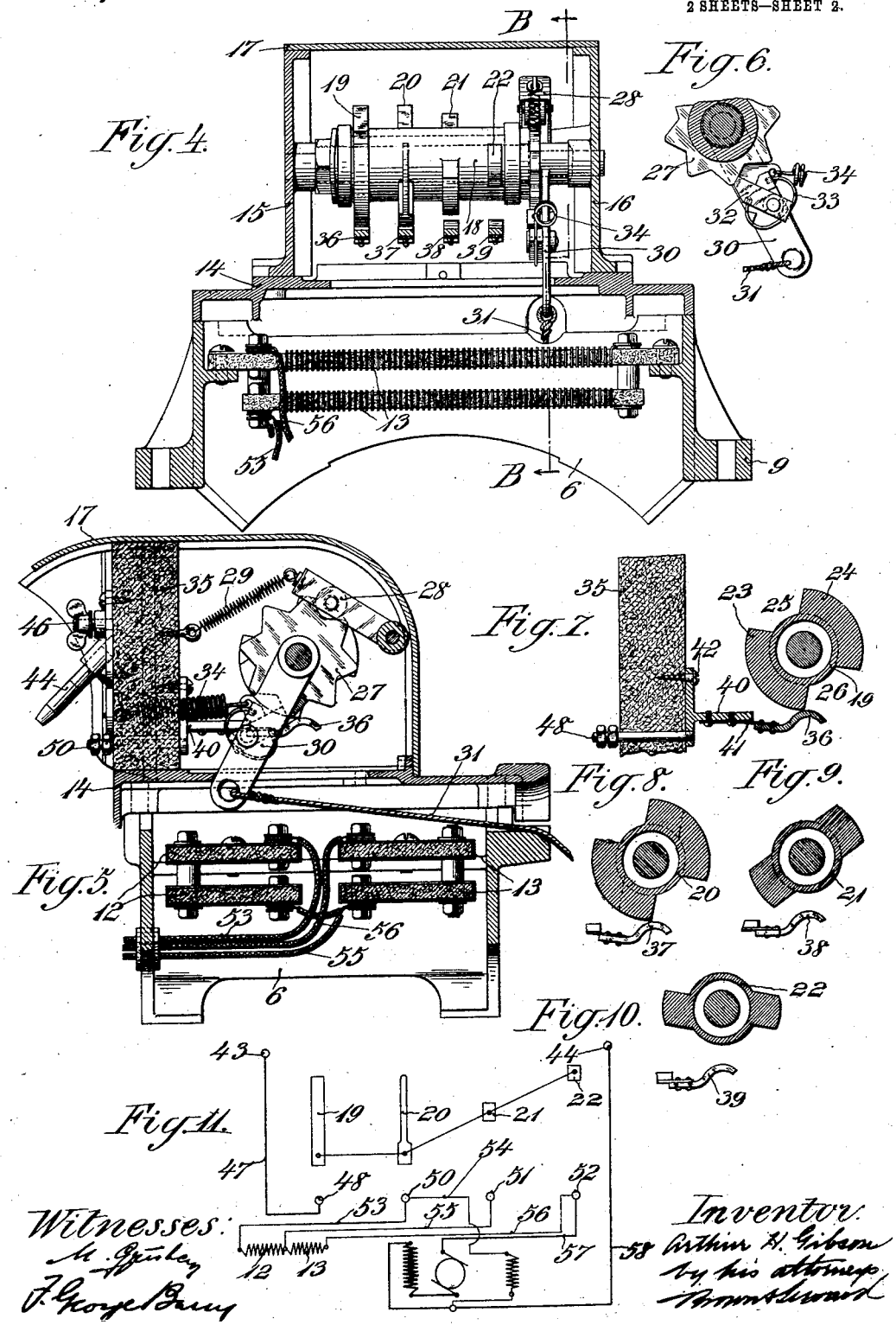

UNITED STATES PATENT OFFICE.

ARTHUR H. GIBSON, OF EASTON, PENNSYLVANIA, ASSIGNOR TO INGERSOLL-RAND COMPANY, OF NEW YORK, N. Y., A CORPORATION OF NEW JERSEY.

CONTROLLER FOR ELECTRICALLY-DRIVEN PULSATORS.

No. 915,951.　　　　Specification of Letters Patent.　　Patented March 23, 1909.

Application filed January 4, 1909. Serial No. 470,626.

*To all whom it may concern:*

Be it known that I, ARTHUR H. GIBSON, a subject of the King of Great Britain, and resident of Easton, in the county of Northampton and State of Pennsylvania, have invented a new and useful Improvement in Controllers for Electrically-Driven Pulsators, of which the following is a specification.

My invention relates to a controller for an electrically driven pulsator, the object being to simplify and render more effective the structure and arrangement of the parts.

In the accompanying drawings, Figure 1 is a view in perspective of a pulsator mounted in juxtaposition to its actuating motor with the controller attached thereto as it appears in use, Fig. 2 is a front elevation of the controller, Fig. 3 is an end elevation of the same, Fig. 4 is an enlarged vertical section in the plane of the line A—A of Fig. 3, Fig. 5 is an enlarged vertical section in the plane of the line B—B of Fig. 4, Fig. 6 is a view in detail, showing the ratchet mechanism in connection with the arm for driving the star wheel and hence the contact drum, Fig. 7 is a view in detail, showing a portion of the front of the controller box with contact finger and contact cam, Figs. 8, 9 and 10 represent in detail additional contact cams on the contact drum and the contact fingers in their respective relations thereto, and Fig. 11 is a diagrammatic view indicating the electric circuits of the controller.

The electric motor for driving the pulsator is here shown as housed within the cylindrical casing 1. The pulsator cylinder 2 is here shown as mounted on the same base as the pulsator driving motor, the whole supported upon wheels 3 for convenience in transportation. The pipes for connecting the pulsator cylinder with the hose, not shown, leading to the drill, not shown, are denoted by 4 and 5.

A more minute description of the above named parts is omitted as my present invention is not directed thereto, except in so far as the controller coöperates with the motor and pulsator in general.

The rheostat box is denoted by 6, and is fitted at its base to rest saddle-like on the cylindrical casing 1, being held in position thereon by means of side bolts 7, the lower end of each being provided with an eye for receiving a bolt 8, and the upper end of each passing through a perforation in the lug 9 on the end of the rheostat box 6, and receiving on its threaded end adjusting and jam nuts 10 and 11. The rheostat box is shown as provided with two sets of resistance coils denoted respectively by 12 and 13.

On top of the rheostat box 6, the base plate 14 of the controller box is bolted and on this base plate 14 the top, ends and front of the controller box are secured. The ends of the controller box are denoted by 15, 16, and may consist of thin upright plates, a curved hood 17 forming the top and back of the box and being secured to the ends in any well known or approved form. The cam contact drum 18 is journaled in the ends 15, 16, of the controller box, as clearly shown in Fig. 4, and carries several cam disks, in the present instance four, denoted respectively by 19, 20, 21, 22. These several cam disks for making contact are each divided into oppositely arranged sections, symmetrical with respect to each other, and separated by an intervening neutral space, so that during a complete revolution of the drum, each disk will have repeated its functions. For instance, the cam disk, denoted as a whole by 19, is provided with projecting sections 23, 24, separated by neutral spaces 25, 26, see Fig. 7, the projections 23, 24, being duplicates of one another and oppositely arranged, and the spaces 25, 26, being also of equal extent so that after the projection 23 has performed its functions, the projection 24, after an interval respectively either of 25 or 26, will repeat the functions which 23 performed. In the same manner the disks denoted as a whole by 20, 21, 22, have their oppositely extending projections symmetrically arranged thereon and are each adapted to repeat the function or functions of its oppositely arranged companion during a single revolution of the drum 18.

The contact drum 18 has fixed to rotate therewith, a star wheel 27 on which a roller lever 28 actuated by a spring 29, engages to hold the star wheel and hence the contact drum 18, in the position to which it may have been rotated.

The contact drum 18 is operated step by step by means of an operating arm 30 hinged to the drum shaft at one end and at its opposite end provided with an operating cord 31 leading to within convenient reach of the operator. The arm 30 carries on its face a rocking dog or pawl 32, the free end of which is held normally in position to engage one of the teeth of the star wheel 27 by means of a spring 33, so that when the arm 30 is pulled, it will cause the star wheel to rotate the distance of one tooth, and when the said arm 30 is released, it will be withdrawn to its position, shown in Fig. 5, by means of a retracting spring 34, the pawl 32, during the return movement, riding over a tooth on the star wheel into engagement with a succeeding tooth.

The front of the controller box is formed of a single piece of suitable non-conducting material, in the present instance a thick slab of wood denoted by 35. This forms a convenient means for attaching the spring 29, the spring 34 and the several contact fingers denoted respectively by 36, 37, 38, 39, these several fingers being secured to brackets 40 by means of spring pieces 41, so as to permit the fingers a downwardly yielding movement under the pressure of the contact cams to insure a good rubbing contact. The several contact fingers are quite similar in their structure and are connected by spring pieces quite similar to one another, the spring pieces being attached to brackets, which latter may be attached to the inner face of the controller box front by one or more screws, as shown at 42, Fig. 7. To the front face of the piece 35, the main plug terminals 43, 44 are attached; also the fuse terminals 45, 46, and conductor 47 leading from the terminal 45 to a bolt 48 which extends through the front piece 35 into engagement with the base 40 for conducting the current from the terminal 43 through the fuse 49 and conductor 47 to the contact finger 36. Similar bolts or plugs 50, 51, 52, extend through the front piece 35 into engagement with the bases which support the contact fingers 37, 38, 39 respectively, and from these bolts 50, 51, 52, conductors lead to the resistance coils in the rheostat box and to the field magnet and armature of the motor as follows. From the bolt 50, a conductor 53 leads to one terminal of the set of resistance coils 12 and a conductor 54 leads from the same bolt 50 to the field magnet. From the bolt 51, a conductor 55 leads to a terminal of the set of resistance coils 13 and from the bolt 52, a conductor 56 leads to another terminal of the resistance coils 13 and a conductor 57 leads to the armature of the motor. A conductor 58 leads from the terminal 46 to the opposite electrical end of the motor, thereby connecting the main plug terminal 44, through the fuse 59, with the motor.

By the above simple structure a unidirection movement for the cam contact drum is provided and the several cam contacts on the drum are so arranged with respect to the circuits through the resistance coils, that a greater or lesser resistance may be introduced at pleasure in order to retard or increase the speed of the motor. For instance, the contact cam 24 having been rocked in engagement with the finger 36, as shown in Fig. 7, and the contact cam 20 having been simultaneously rocked in contact with the finger 37, as shown in Fig. 8, the contact cams 21, 22, will occupy the position shown in Figs. 9 and 10, so that the current will pass from the finger 36 along the drum 18 to the cam 20, and thence by the finger 37, bolt 50 and conductor 53, through both resistance coils and conductor 56 to bolt 52 and thence by conductor 57 to the motor armature, interposing full resistance, the cam 20 in the meantime serving to conduct the current to the field through the conductor 54. If the drum 18 be further rotated to engage the contact cam 21 with its finger 38, while the cams 19 and 20 still remain in contact with their respective fingers, the resistance coils 12 will be shunted out and the coils 13 will be introduced by the current passing through the bolt 51 and the conductors 55 and 56. If the drum 18 be further rotated in the same direction to engage the contact cam 22 with the finger 39, the current will be allowed to pass through bolt 52 and conductor 57 directly to the motor armature without any resistance being interposed, while the field will still be supplied. The same successive order of full resistance, partial and no resistance will be repeated during the second half revolution of the contact drum 18.

The simple arrangement of the ratchet carried by the operating arm of the drum serves to bring the manipulation of the drum effectively within the command of the operator, while the several parts in their structure and arrangement provide for ready access in case of attention or renewal.

In the simple diagram Fig. 11, the several contact cams have been lettered to correspond to the cams shown in the detail figures and the several bolts leading to the respective fingers have been lettered as in the front view Fig. 2. So too, the conductors leading from these several bolts have been lettered to correspond with the conductors shown in Fig. 2.

What I claim is:

1. The combination with a rheostat box, of a controller box mounted thereon and having one of its walls formed of a slab of insulating material, main plug terminals attached to one face of said wall, contact fingers attached to the opposite face of said wall, a cam contact drum mounted in said controller box in position to engage the said contact fingers and means for operating said drum.

2. A controller box having a front wall of non-conducting material, end walls engaged with the front wall, a hood-like cover projecting over the front wall, main terminals attached to the outer face of the front wall, contact fingers attached to the inner face of the front wall and a contact drum mounted in position to engage the said contact fingers.

3. A controller box having one of its walls formed of suitable insulating material, main plug terminals attached to the outer face of the wall, fuse terminals attached to the outer face of the wall, contact fingers attached to the inner face of the wall, conducting bolts engaged with the contact fingers and projecting through the wall for receiving electric conductors at the front of the wall, a cam contact drum mounted within the box in position to engage the contact fingers and means for imparting to the drum a step by step movement.

4. In a controller box, the combination with spring contact fingers and electric conductors leading therefrom, of a cam contact drum provided with cams arranged to engage the contact fingers, a star wheel mounted to rotate with the drum, a spring actuated arm loosely mounted on the drum shaft, a pawl carried by the arm for engaging the star wheel and a spring actuated retaining dog for holding the star wheel and hence the drum against unintentional displacement.

5. In a controller box, the combination with spring contact fingers and electric conductors leading therefrom, of a cam contact drum, the cams thereon being divided into a plurality of symmetrical sections, the several sections being arranged to repeat their functions during a revolution of the drum and a ratchet mechanism supported on the drum shaft for operating the drum continuously in one direction.

6. In a controller box having one of its walls formed of insulating material, a series of spring contact fingers attached to the inner face of the wall, conducting bolts passing through the wall for connecting the fingers with conductors on the outside of the wall, a cam contact drum mounted within the controller box, a swinging arm hung on the drum shaft, a retracting spring connected with the arm and with the said insulating wall, a spring actuated pawl carried by the arm, a star wheel carried by the drum in position to be engaged by the pawl and means for operating the swinging arm from a point distant from the controller box.

7. In a controller box having one of its walls formed of insulating material, a series of spring contact fingers attached to the inner face of the wall, conducting bolts passing through the wall for connecting the fingers with conductors on the outside of the wall, a cam contact drum mounted within the controller box, a swinging arm hung on the drum shaft, a retracting spring connected with the arm and with the said insulating wall, a spring actuated pawl carried by the arm, a star wheel carried by the drum in position to be engaged by the pawl, a retaining dog engaged with the star wheel, a spring one end of which is connected with the dog and the opposite end with the insulating wall, and means for operating the swinging arm from a point distant from the controller box.

8. In a controller box, a cam contact drum, means including a star wheel carried by the drum for operating the drum in one direction and a spring actuated dog provided with a roller in position to engage the teeth of the star wheel to hold the said contact drum against unintentional displacement.

9. An electric controller drum, a star wheel attached thereto, a star wheel roller coöperating therewith to hold the drum in definite positions, and a pawl coöperating with the aforesaid star wheel as a ratchet device.

10. In combination, an electric motor, a pulsator in proximity thereto, a wheeled support common to the motor and pulsator, a rheostat box removably secured on the motor casing and a controller box mounted on the rheostat box.

In testimony, that I claim the foregoing as my invention, I have signed my name in presence of two witnesses, this thirty-first day of December 1908.

ARTHUR H. GIBSON.

Witnesses:
CHAS. B. BUNNER,
JOHN H. SPENCE.